United States Patent [19]
Baurle et al.

[11] 4,268,829
[45] May 19, 1981

[54] STEERABLE NULL ANTENNA PROCESSOR WITH GAIN CONTROL

[75] Inventors: Herbert F. Baurle; Raymond J. Masak, both of E. Northport, N.Y.

[73] Assignee: The United States of America as represented by the Secretary of the Army, Washington, D.C.

[21] Appl. No.: 132,940

[22] Filed: Mar. 24, 1980

[51] Int. Cl.³ .............................................. G01S 3/06
[52] U.S. Cl. .............................. 343/100 LE; 343/854
[58] Field of Search ................. 343/853, 854, 100 SA, 343/100 LE

[56] References Cited
U.S. PATENT DOCUMENTS 4,177,464 12/1979 Masak ........................... 343/100 LE Primary Examiner—Eli Lieberman
Attorney, Agent, or Firm—Nathan Edelberg; Jeremiah G. Murray; Bernard Franz

[57] ABSTRACT

An adaptive signal processing system for enhancing the signal-to-interference characteristics on both receive and transmit, using an in-phase quadrature correlator to control phase and amplitude adjust circuits located in the antenna signal paths. To increase the dynamic range, automatic gain control circuits are included in the reference and feedback signal paths to the correlator.

10 Claims, 12 Drawing Figures

STEERABLE NULL ANTENNA PROCESSOR WITH GAIN CONTROL

The invention described herein may be manufactured, used, and licensed by or for the Government for governmental purposes without the payment of any royalties thereon.

BACKGROUND OF THE INVENTION

1. Field of the Invention

This invention relates to radio receiving and transmitting systems which adaptively suppress interference by controlling the null directivity of the pattern of an antenna array.

2. Description of the Prior Art

Adaptive array antenna systems are currently the subject of intense interest and investigation/development for radar and communications applications. The principal reason for the interest is their ability to automatically steer nulls onto undesired sources of interference, thereby reducing output noise and enhancing the detection of desired signals. These systems usually consist of an array of antenna elements and a real-time adaptive receiver-processor which has feedback control over the element weights.

Communications and radar antenna systems using either conventional narrow band or spread spectrum modulation formats are susceptible to degradation in SNR performance caused by undesired "noise" which intrudes via the antenna sidelobes and mainlobes. The noise may consist of deliberate electronic countermeasures (ECM) friendly RF interference (RFI), clutter scatterer returns, and natural noise sources. This degradation is often further aggravated by motion of the antenna, poor siting conditions, multipath, and a changing interference environment. Adaptive array techniques offer possible solutions to these serious interference problems via their flexible capabilities for automatic null steering and notching in the spatial domain, the frequency domain, and in polarization. Adaptive nulling is considered to be the principal benefit of adaptive techniques at the present time.

A tutorial paper on "Adaptive Arrays—An Introduction" by William F. Gabriel appears in the *Proceedings of the IEEE* Vol. 64, No. 2, February 1976, pages 239–272. U.S. patents of interest include:

| | | |
|---|---|---|
| 3,713,167 | David | Class 343/797 |
| 3,932,818 | Masak | Class 328/167 |
| 3,981,014 | Masak | Class 343/100LE |
| 4,024,541 | Albanese et al | Class 343/17.1R |
| 4,064,422 | Masak | Class 364/841 |
| 4,097,866 | Frost et al | Class 343/100LE |
| 4,075,633 | Lewis | Class 343/100LE |
| 4,105,977 | Fitting et al | Class 325/472 |

It is also possible that an unfriendly source of deliberate interference may possess the capability for monitoring the transmissions from the transceiver. It is therefore desirable not only to protect the receiver from the interference, but to also prevent information from the transmitter from being intercepted.

The least mean square (LMS) algorithm has been firmly established for adaptive antenna systems. A hard-limiter modification has been introduced into the basic control loop to improve the circuit characteristics, in particular the system dynamic range is doubled.

SUMMARY OF THE INVENTION

An object of the invention is to provide a system with adaptive nulling when receiving over an extremely wide dynamic range.

According to the invention, automatic gain control is incorporated not only in the antenna-correlator or reference branch, but also in the feedback branch of the system, with the gain control voltages derived from a common source. This source includes at least the antenna-correlator or reference signal, and in one embodiment the automatic gain control signal is derived from a sum of the two detected signals. Square law detection is preferred in deriving the gain control signal.

CROSS REFERENCE TO RELATED APPLICATION

Part of the matter disclosed herein is covered by a copending application, Ser. No. 132,941, filed Mar. 24, 1980, by R. J. Masak, for Adaptive Steerable Null Antenna Processor. That application is incorporated herein by reference.

DETAILED DESCRIPTION

Figure 1:
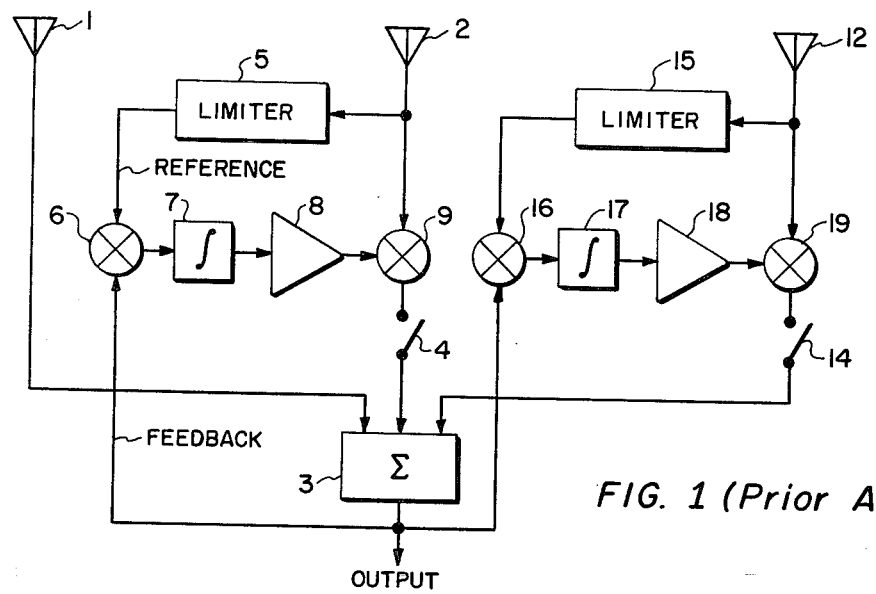
FIG. 1 is a diagram of a basic prior art steerable null antenna processing system.

A basic prior art adaptive steerable null antenna system is illustrated in FIG. 1. Consider first a system comprising two antenna elements, which may be a main element 1 and an auxiliary element 2. The output signal from the main antenna element 1 is fed to a summer or combiner unit 3. An adaptive loop associated with the auxiliary antenna element 2 may be connected to the summer 3 via a switch 4. The loop is comprised of a limiter 5, a multiplier 6, an integrator 7, an amplifier 8, and a multiplier 9. When one interfering signal is present, the loop adjusts the phase and amplitude of the interfering signal from antenna element 2 to cancel the interfering signal in the main channel. Another antenna element 12 may be connected to the system by closing switch 14. This element has an adaptive loop comprising limiter 15, multiplier 16, integrator 17, amplifier 18 and multiplier 19. This loop permits a second interfering signal to be cancelled. In general, to cancel N interfering signals requires at least N+1 antenna elements and at least N adaptive loops. In some systems the main antenna element is directive and the auxiliary elements are omni-directional. Actual systems often include local oscillators to change the processing frequencies at various points, band pass filters, and other components.

Figure 2:
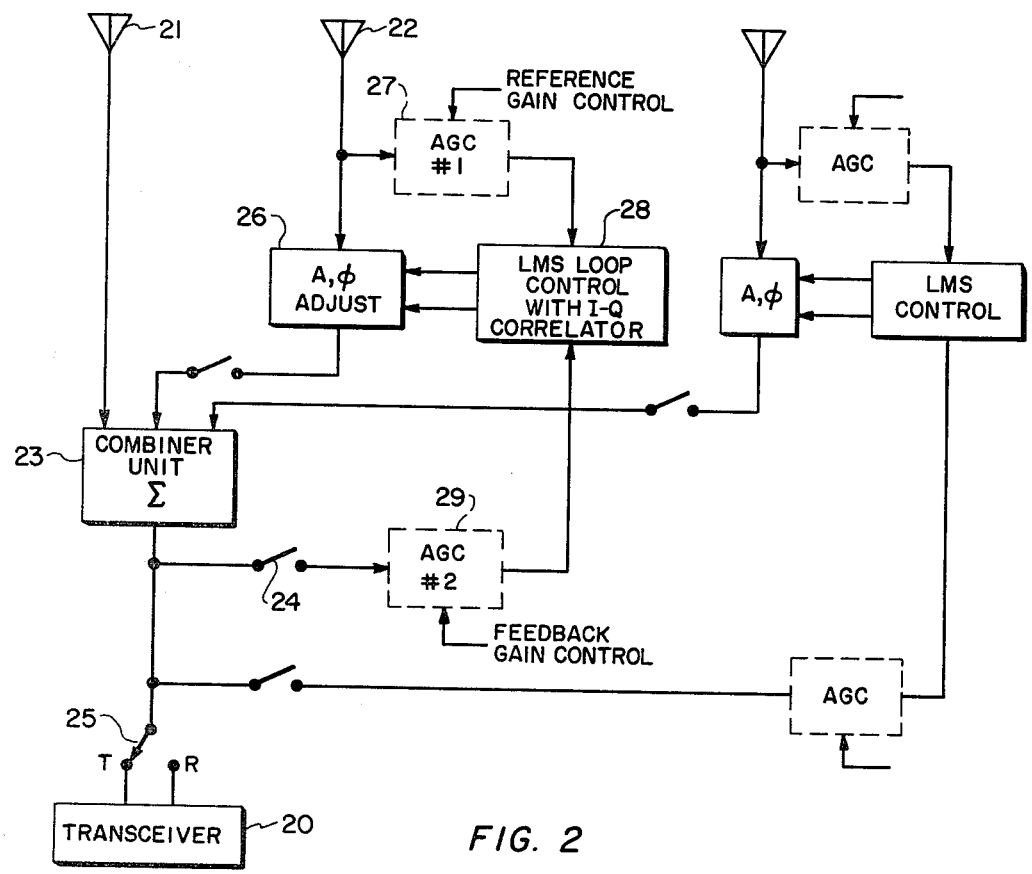
FIGS. 2, 3, and 4 are block diagrams of receive-transmit steerable null antenna processor systems.
Figure 3:
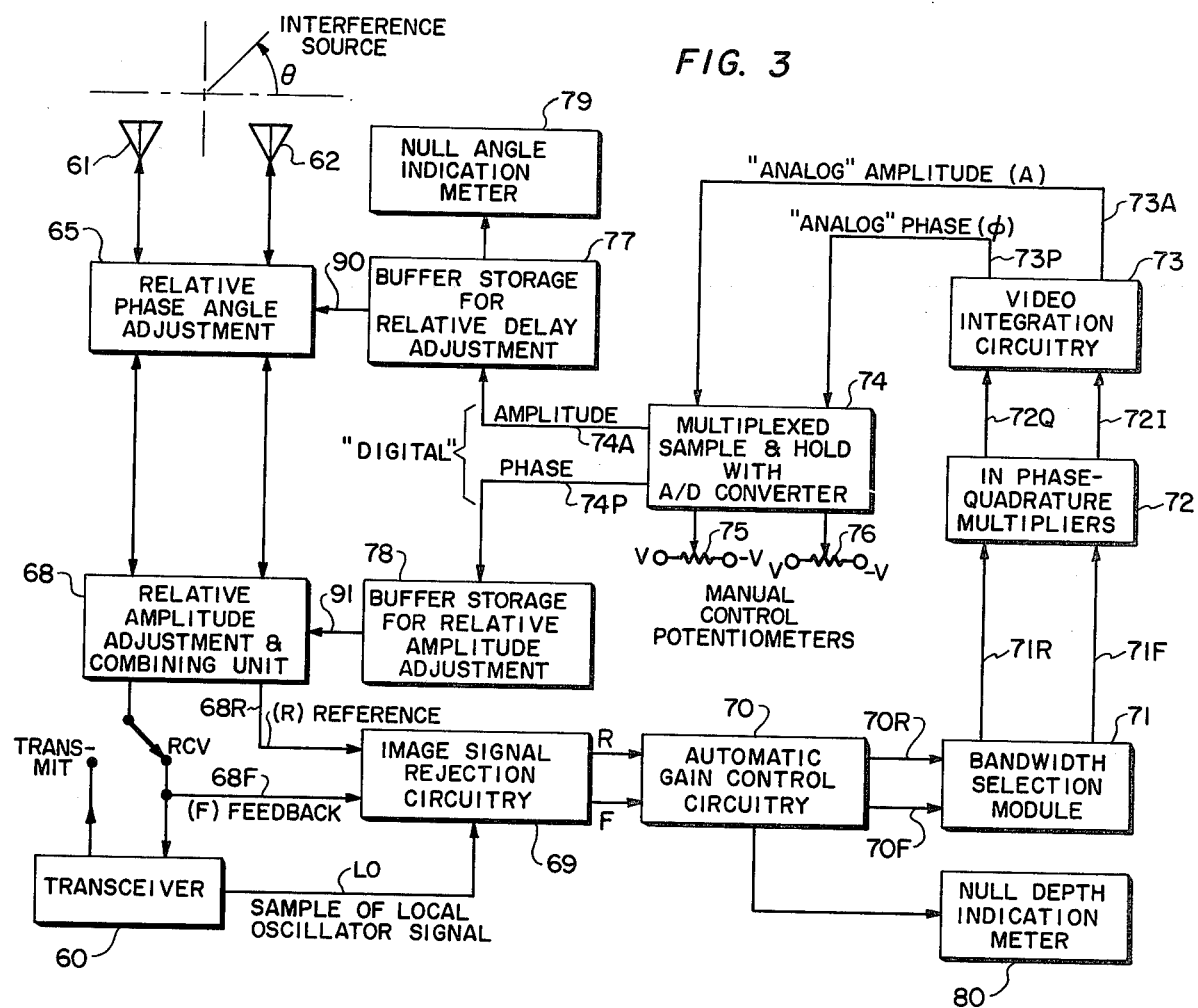

FIGS. 2 and 3 illustrate two approaches for a receive-transmit steerable null antenna processor which may incorporate the features of this and the related patent application. They both include high power phase shifters and amplitude adjust circuits in the path between the antenna array and the transceiver; and both use an LMS (least mean squares) closed loop processor which includes an I-Q (In phase-quadrature) correlator. In FIG. 2 the phase and amplitude adjust circuits are provided in the branch between an auxiliary antenna element, the reference signal comes from the auxiliary antenna element, and the feedback signal is from the summation of the main and auxiliary antenna branches. In FIG. 3 the phase and amplitude control circuits are in all antenna branches, although for one antenna they may be fixed in value. The reference and feedback signals are both taken from the combiner, which may be a sum-difference hybrid. A VHF system design for radio equipment operating in the 30-80 megahertz band interfaces with two conventional center-fed vertical antenna elements and the RF input and output of a transceiver. A UHF system (not shown) interfaces between four antenna elements and an appropriate transceiver. Both designs permit rapid manual and automatic nulling of received undesired signals over a wide dynamic range. The two element system permits the nulling of one signal by 35 dB over a range of 360 degrees. The four element system permits a 35 dB nulling of two signals different in azimuth. Both systems also permit rf transmission at high power levels with any null pattern generated in the most recent receive mode. Deep null transmission in any of the selected aximuth is also possible through the use of alternate manual controls. Auxiliary circuitry such as a null depth meter and null azimuth readout are also available to the operator.

The system concept for each system design involves the integration of an adaptive control technique with incrementally variable phase and amplitude adjustment circuitry placed directly at the rf antenna outputs. The adaptive control mechanism senses the interference environment and adjusts the relative amplitudes of one or more rf modules attached to the antennas such that a minimization of interference occurs after a summation of the weighted antenna signals. This processed signal then becomes the input to the transceiver.

The communications transceiver is connected to the output. When the transceiver set transmits, a relay disconnects the receiver and connects the transmitter. The loop is opened and the existing settings of the phase shifter and amplitude control are held. Transmitted power passes through these same units with the result that a transmission null is formed at the same azimuth angle on both the transmission and the reception. When transmission ceases, the receiver is again connected and the loop is closed, continuously maintaining the null. A continuous-data and unmodified LMS control loop is basically a closed loop analog feedback system which uses correlation techniques to minimize output power level in accordance with an optimum mathematical criterion called the least-mean-square algorithm. Hardware implementations of the technique generally suffer from a lack of dynamic range in that excellent performance can be readily achieved only over a relatively small input dynamic range. The modifications to the basic LMS control loop generated during this program involve the use of suitably controlled automatic gain control circuits (AGC) which can extend interference cancellation capability over the required wide input dynamic range.

In the sampled-data VHF system of FIG. 3 the operation of correlation and AGC are performed with analog circuitry driven by two outputs from the ABC network. The only signal required from the transceiver itself is a sample of the local oscillator which is used to optimize performance in the band near the desired communications channel. The two analog video signals coming from the correlator are sampled and quantized in a multiplexed A/C converter which alternately updates the values in the incrementally variable time delay phase shifter and ABC networks. Phase data is quantized to seven bits and relative amplitude data to six bits. The portion of the system generating the multiplexed digital control signals when driven by the ABC outputs can be considered a basic building block of higher order systems such as the four element UHF design.

The time delay phase shifter used in both the VHF and UHF systems is composed of switched lengths of transmission lines.

To summarize, a two-element VHF system configured with the LMS loop controller consists of three major blocks or component circuits, namely
 (1) delay line phase shifters,
 (2) amplitude balance control, and
 (3) the LMS loop controller.

The phase shifter compensates for the difference in the time of arrival of the interfering wave form at the two antennas. The amplitude balance control (ABC) adjusts the amplitude in the two channels.

Figure 4:
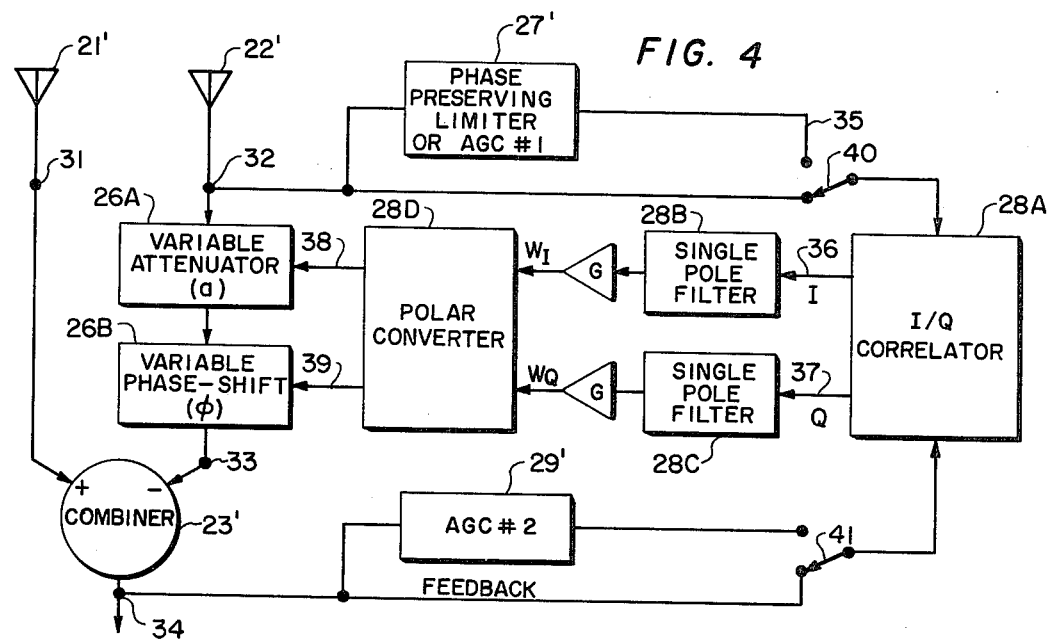

Another system configuration including the above components is shown in FIG. 4. With phase and amplitude properly adjusted, the interference is cancelled out at point 34. The LMS control loop consists basically of a correlator and a polar coordinate converter.

The purpose of the correlator is to compare the output at point 34 with the input at the antenna. The correlator causes the phase shifter and amplitude control to go to the settings which result in cancellation of the interference at point 34. When more than one signal is present, the correlator adjusts the phase and amplitude to null the component of the output having the highest correlation with the input. If the interference is the strongest signal present at the correlator, the null is formed on the interference.

The I/Q correlator provides two output signals, one in the form of in-phase (I) and the other in the form of quadrature components (Q). These two signals must be converted to phase ($\phi$) and amplitude (A) to control the phase shifters and the ABC respectively. The coordinate converter performs this function. Together, these key components comprise a feedback system which continuously corrects the phase and amplitude of the interfering signal to maintain a null during reception.

Since the I/Q correlator is the most important component of the LMS control loop, a few words should be mentioned about its operation. The high level, unprocessed RF from one antenna is multiplied by the residue signal existing in the processor beyond the nulling point.

Figure 5:
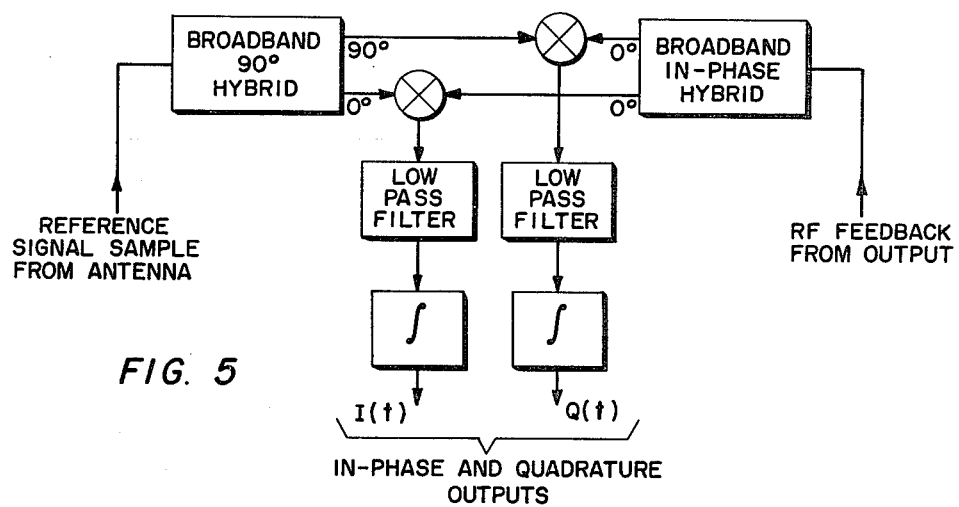
FIG. 5 is a block diagram of a broadband In phase-Quadrature correlator for the system of FIGS. 2, 3 or 4.

Since the undesired signal is assumed to be stronger than the desired signal, the loop gain is higher for the undesired, and the system tends to form a null on the undesired signal. The greater the ratio of desired to undesired signal, the greater the suppression of the undesired signal. In some cases, the signal levels arriving at the antenna from desired and interfering sources may be approximately the same. In this event, a manual control of the null steering function is provided; the operator adjusts the amplitude and phase control to achieve the desired improvement in S/I ratio. FIG. 5 contains a block diagram of the wideband I/Q correlator, which may be used in any of FIGS. 2, 3 or 4.

The most important signal representations are included in FIG. 5, including the reference input and the RF feedback residue signal from the input of the receiver. Miniature quadrature and in-phase hybrids are available in the required frequency bands of interest. Using these two hybrids and two broadband mixers, the video in-phase and quadrature outputs are available after some nominal low-pass filtering. These in-phase and quadrature loop control signals are then smoothed in the loop integrators, generating the actual control loop signals used to perform the required processing. The output of the correlator is in the form of I/Q components. These components may be converted to phase and amplitude by a polar coordinate converter, or they can be dititized as shown in FIG. 3, in order to control the phase and amplitude adjust circuits.

In FIG. 2 a third antenna element and a second loop are shown to illustrate how loops may be added to provide null steering for more than one interfering source, similar to the prior art as shown in FIG. 1. More than two loops may be used. There are also other arrangements known for processing and combining signals from three or more antenna elements and two or more loops.

Four-Element Arrays Using the LMS Control Loop

Figure 6:
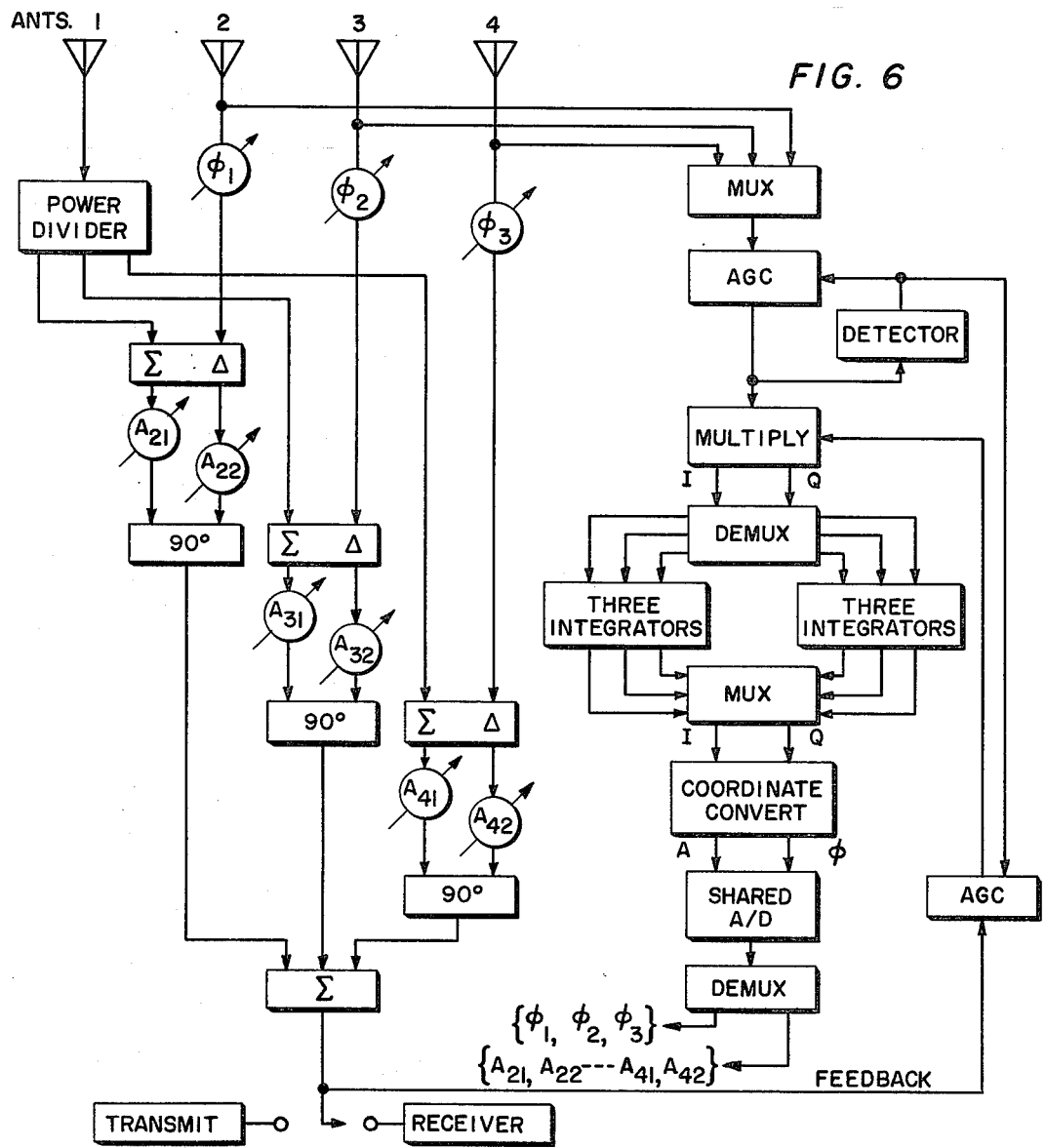
FIG. 6 is a block diagram of a four-antenna-element receive-transmit steerable null antenna processor system with hybrid serial-parallel control loop.

All the previous analysis on the LMS control loop is directly applicable to the four-element case. However, the number of nulls is not only proportional to the number or array elements minus one, but is also proportional to the number of loops. If in the four-element case the system is required only to null two undesired signals, then only two loops are required. However, if the system must null three undesired signals, then three loops are required. In order to circumvent the dependence of nulling the number of undesired signals to the number of loops, time sharing the loop with each antenna was proposed. FIG. 6 shows a simplified block diagram of such an approach.

Implementation of a 30-80 MHz System

This section contains a description of a 30-80 MHz two antenna implementation beginning with a functional system description. The system operates as a closed loop sampled-data feedback control system which minimizes unwanted interference signals at the rf input of transceiver sets. The system also has the capability of transmitting on the most recent null pattern since the controlled elements in the system can also withstand the high power levels of the transmit mode.

FIG. 3 contains a functional block diagram of the 30–80 MHz system. For this implementation the system interfaces with two conventional center-fed antennas 61 and 62 such as the AS-1729/VRC and a matching communications transceiver 60, such as an AN/VRC-12. In the receive mode of operation, internal control signals are generated which adjust the relative amplitudes and phases of the signals from the two antennas such that a minimization of received interference occurs after the weighted signals are combined.

The output of the amplitude adjustment and combining unit 68 generates a reference signal at lead 68R and a feedback error signal at lead 68F. The feedback signal also forms the input to the receiver. The reference and feedback signals are eventually correlated to generate the actual control signals used to make the amplitude and phase adjustments. Three additional processing functions are first performed on both the reference and feedback signals prior to correlation.

The first of these processing functions is the use of image signal rejection circuitry 69. The purpose of this module is to restrict off-line control loop operation to the sub-band of interest and to prevent any image sub-bands or image frequencies within a selected sub-band to be present in the control loop circuitry. The in-line rf control components actually used to perform the amplitude and phase adjustments cover the complete 30-80 MHz band. The image signal rejection circuitry requires a sample of the local oscillator signal in order to perform the required mixing operations for each sub-band of interest. The mixing operations are arranged such that the output center frequency of the image rejection module is a constant independent of the sub-band or channel of reception. The use of this circuitry in combination with the broadband rf control components permits operation anywhere within the 30-80 MHz band with maximum interference protection centered on the selected information channel.

The second processing operation in the sequence is the use of automatic gain control (AGC) circuitry 70. This IF circuitry operates on the reference and feedback signal outputs from the image rejection module. Use of the AGC circuitry extends the dynamic range in a manner such that a fixed amount of cancellation or contrast ratio can be achieved over a wide input dynamic range of interference. Signals in the AGC module are also used as inputs to a null depth indication meter 80.

The last processing function occurring before actual correlation uses a bandwidth selection module 71 to optimize control loop operation. This module contains two pairs of bandpass filters. Each pair is composed of one filter nominally matched to the bandwidth of the matching network usually associated with the antennas, and other nominally matched to the narrower channel bandwidth. When the first filter is used in both reference and feedback paths, operation is optimized to suppress interference within the band of the antenna matching network. When the second is used, operation is optimized to suppress in-channel interference.

The reference 71R and feedback 71F outputs of the bandwidth selection module are then correlated to generate the actual amplitude and phase control signals. Both the reference and feedback signals are coherent and on the same IF carrier frequency. The correlation of these two signals is accomplished in a two step procedure. In the first step, the reference signal is split into in-phase and quadrature components while the feedback signal is split into two in-phase components. Cross multiplications of appropriate pairs of these four signals generate two bipolar video signal outputs from the module 72 labeled "in phase-quadrature multipliers" in FIG. 3. the correlation process is completed by integrating these two video signals as shown in the figure. The required system control signals for amplitude (A) and phase ($\phi$) are generated directly at the output of the video integration module. No polar coordinate conversion is required.

Both required system control signals are in an analog format at this point in the system. The required digital control signals used to drive the relative phase and amplitude adjustment circuits are generated by quantizing (analog to digital conversion) the two outputs of the video integration module. In order to minimize hardware complexity multiplexing and buffer storage techniques are used.

Manual phase and amplitude control are available by switching the input of the A/D converter to appropriate potentiometers. The null angle indication meter 79 can be driven directly by the information contained in the buffer storage module associated with the relative delay adjustment signal.

Figure 7A:
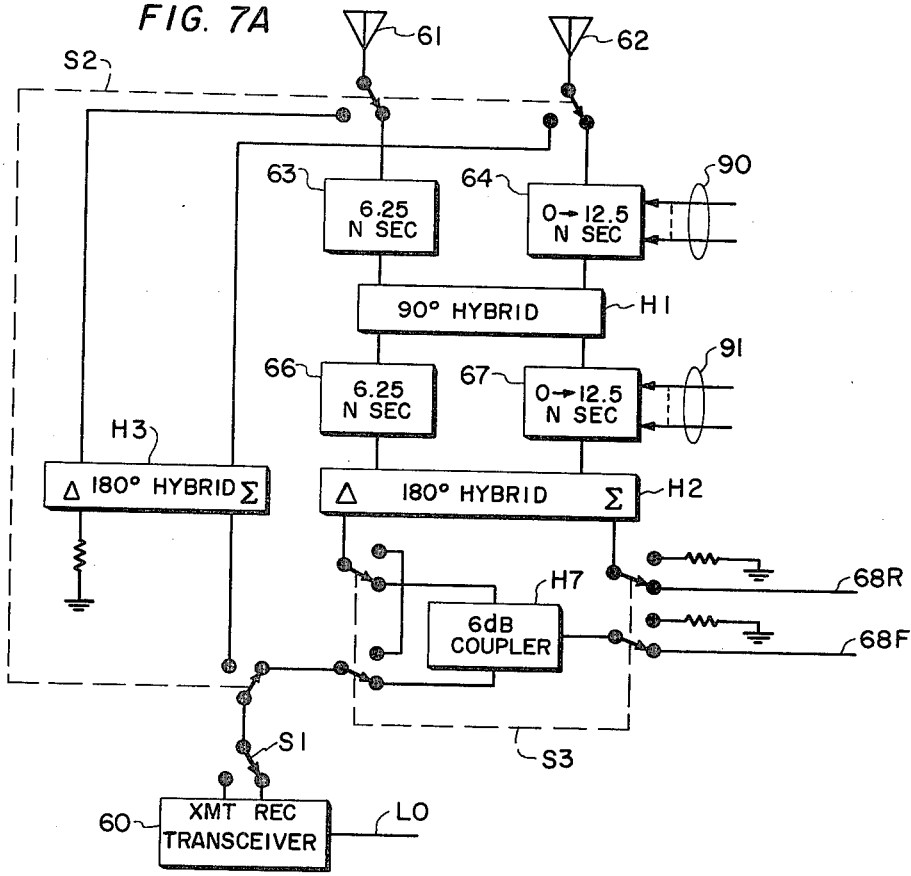
FIG. 7 comprising 7A, 7B and 7C is a more detailed functional block diagram of the system of FIG. 3.

A further expansion of the functional block diagram of FIG. 3 is shown in FIG. 7 comprising parts 7A, 7B and 7C.

The system possesses several operational modes along with several auxiliary circuit features. The modes are selected to take maximum advantages of the capabilities of the processor while simultaneously minimizing the effects when not required. The modes are selected by several double throw switches (or relays) shown in FIG. 7 as S1–S5. Switch S1 (FIG. 7A) is transmit-receive control. A three-pole switch S2 disconnects the null steering circuits and connects a sum-difference hybrid H3. A four-pole switch S3 in the position shown places a 6 dB coupler H7 between the difference output of the combining hybrid H2 and the transceiver, with an output to lead 68F, and connects the sum output of hybrid H2 to lead 68R, while the other position of the switch by-passes coupler H7 and connects terminating resistors in place of leads 68R and 68F. A four-pole switch S4 (FIG. 7B) is for bandwidth selection. A two-pole switch S5 (FIG. 7C) selects manual or automatic control of the null steering.

Control System Signal Flow

This subsection describes the signal flow in the major elements of the control system. These elements includes the rf amplitude and phase control modules, image rejection and AGC circuits, bandwidth selection module, correlator, and digital multiplexing units. The discussion is keyed to the block diagram of FIG. 7.

RF Amplitude and Phase Control

It is assumed that the system is in a wideband receiving mode. An undesired signal within the 30 to 80 MHz band enters antenna 61 and is channeled via switch S2 through a 6.25 nanosecond delay line 63 offset. A zero to 12.5 nanosecond variable delay line 64 is placed in a corresponding position after switch S2 in order to adjust the relative delay of the signal coming from antenna 62.

The output of the delay offset module 63 drives the 90 degree hybrid H1 of the amplitude balance control circuit. The required phase shift control of the ABC network is achieved through the use of one fixed time delay network 66 and one variable time delay network 67, similar in design to the modules used to adjust the relative time delays between antennas 61 and 62. Here again, the fixed delay module 66 in the ABC network is set at 6.25 nanoseconds. Both the "phase" and "amplitude" variable delay networks are initially set at their mid-range values of 6.25 nanoseconds. By choosing the mid-range values of delay and selecting the difference port output of the 180 degree hybrid H2 in the ABC network, the system is biased to operate about a natural broadside null. In some embodiments, the ABC configurations used the same types of 90 degree and 180 degree hybrids with their system positions interchanged with respect to the positions used in FIG. 7A. Both configurations would work; the relative location selected does, however, posses a natural broadside null as opposed to the natural end-fire null of the other configurations.

The sum ($\Sigma$) port output of the ABC network forms the reference signal input on lead 68R to the control circuits; while a 6 dB down sampled signal from the difference ($\Delta$) port output forms the feedback signal on lead 68F. The direct output of the coupler H7 is channeled to the transceiver input.

Image Rejection and AGC Circuits

The circuit realizations of the functional operations of image signal rejection and automatic gain control for both reference and feedback path signals begin at leads 68R and 68F. The signal flow for both the reference and feedback signals are essentially identical; therefore, only the reference path will be considered in detail.

The switchable phase shift networks and hybrids used to perform the relative phase and amplitude adjustments are linear at the maximum signal levels expected both on receive and during transmit. Therefore, handling the high end of the required dynamic range presents no problems for these networks.

The processor control functions are activated only during the receive modes of operation.

Mixer M1 translates the frequency of any rf interference signal in the 30–80 MHz band to a 50 MHz band centered at 103.5 MHz. A bandpass filter F1 centered at 103.5 MHz truncates this 50 MHz band to 10 MHz.

The local oscillator signal (L) for mixer M1 is generated in the following manner. Samples of the transceiver local oscillator are mixed with a system 92 MHz oscillator. Mixer M5 performs the required operation. The R port mixer input of mixer M5 ranges in frequency between 41.5 and 91.5 MHz. This local oscillator frequency range is typically used in 30–80 MHz transceivers so that a constant difference frequency output of 11.5 MHz occurs no matter which channel is selected. The I port output of mixer M5 goes between 133.5 and 183.5 MHz and is selected through use of a bandpass filter F5 centered at 158.5 MHz with a 1 dB bandwidth of 50 MHz. Filtering on the order of four or five poles is adequate. A mixer driver amplifier A5 covering the band provides L port drive to mixers M1 and M3 after a 3 dB power division.

Wide dynamic range subminiature flatpack double balanced mixers are available for use as mixers M1 and M3. Models such as the ANZAC MD-139 are suitable. Since the output frequency of mixer M1 is slaved to the selected channel of the transceiver by use of mixer M5, the selected channel will always appear at an output center frequency of 103.5 MHz. The bandpass filter used at this center frequency has a bandwith of 10 MHz, adequate to permit wideband operation but narrow enough to provide additional out-of-band signal rejection. A four or five pole filter design is adequate.

In the reference path processing this bandpass filter F1 is placed between reference attenuator X1 and reference amplifier A1. These other two modules perform one-half of the AGC function for the reference channel signal. The other half is performed down line at another center frequency.

The reference channel gain control function is partially accomplished by controlling the value of reference attenuator X1. Flatpack voltage controlled attenuators covering 1.5 MHz to 1 GHz are presently available. Models such as the ANZAC AT-101 can provide about 60 dB of attenuation control range with a minimum attenuation or static loss of about 3 dB. The AGC control voltage VC acts in a manner to increase the loss in reference attenuator X1 when the maximum output of mixer M1 occurs.

The three required local oscillator signals are available from unit 92 as the outputs of a three way power divider which is driven by a narrowband amplifier and the 92 MHz offset oscillator. The required gain of the 92 MHz amplifier can be supplied by either an Avantek GPD-403 or an ANZAC AM-101 "unit amplifier."

The image signal rejection function is completed by taking the 11.5 MHz (103.5−92=11.5) difference frequency output from mixer M2. The second half of the AGC function is completed by processing the I port output of Mixer M2 in reference attenuator X2 and reference amplifier A2. The bandpass filter F2 used at the output of attenuator X2 is used to establish the band of operation. This filter has approximately four to five poles and a bandwidth of 5 MHz centered at 11.5 MHz.

Figure 7B:
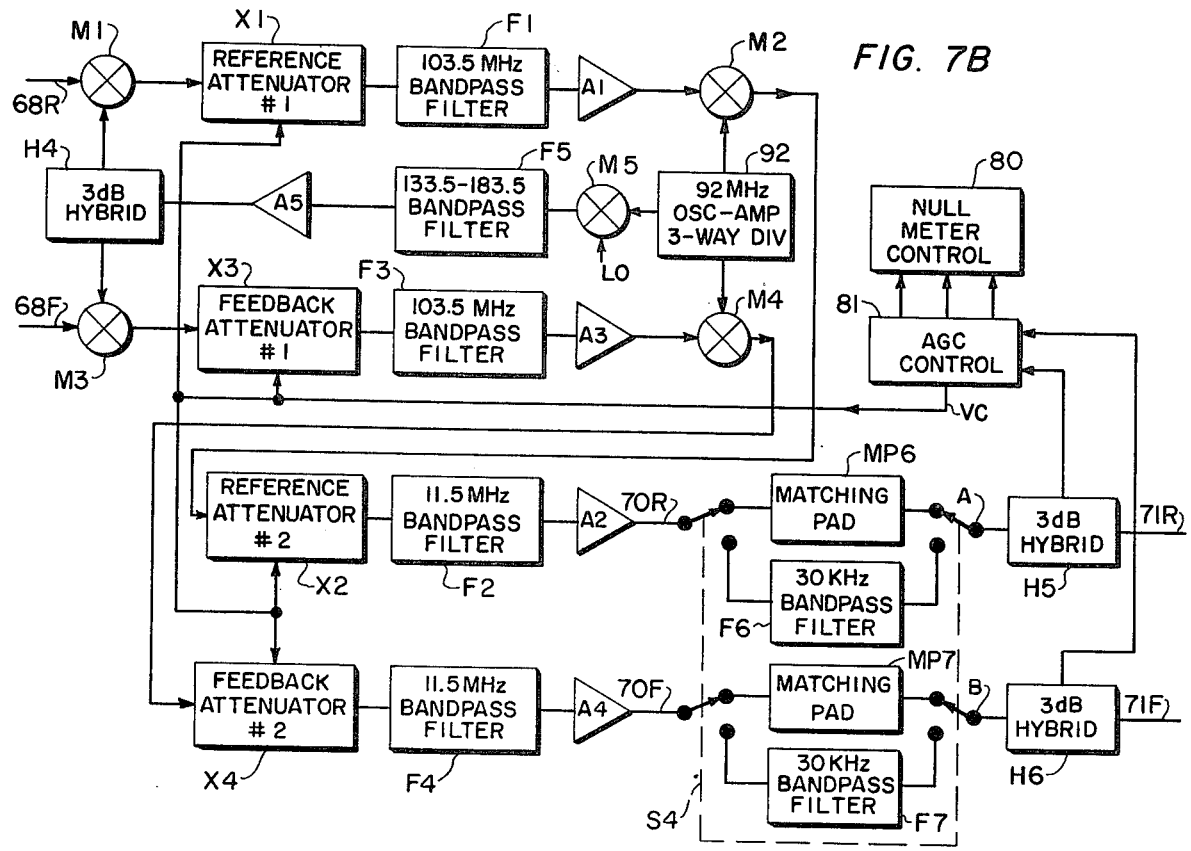

The AGC action and image frequency rejection is accomplished in an almost identical manner for the feedback path of FIG. 7B, except for the following change. The gain of feedback amplifier A3 is increased by 6 dB to about 56 dB to make up for the losses associated with the 6 dB coupler. The gain of feedback amplifier A4 is the same as reference amplifier A2. Feedback attenuators X3 and X4 are designed the same way as reference attenuators X1 and X2 respectively.

Residue Amplifier

A residue amplifier A7 (FIG. 7C) of 20 dB gain is placed between point B and the input to the in-phase hybrid H9 of the correlator. The amplifier is selected so that it is in saturation by about 14 dB at the beginning of the adaptation process; that is, when its input is a maximum of 10 dBm, (after the 3 dB loss of the hybrid used to drive the AGC circuits). In steady state the input signal to the amplifier drops to −30 dBm generating a residue amplifier output of −10 dBm. This level is chosen to insure linear operation of the multipliers or phase detectors used in the correlator. In the correlation process the terms "multipliers" and "phase detectors" are used interchangeably.

AGC Control Circuits

Figure 8:
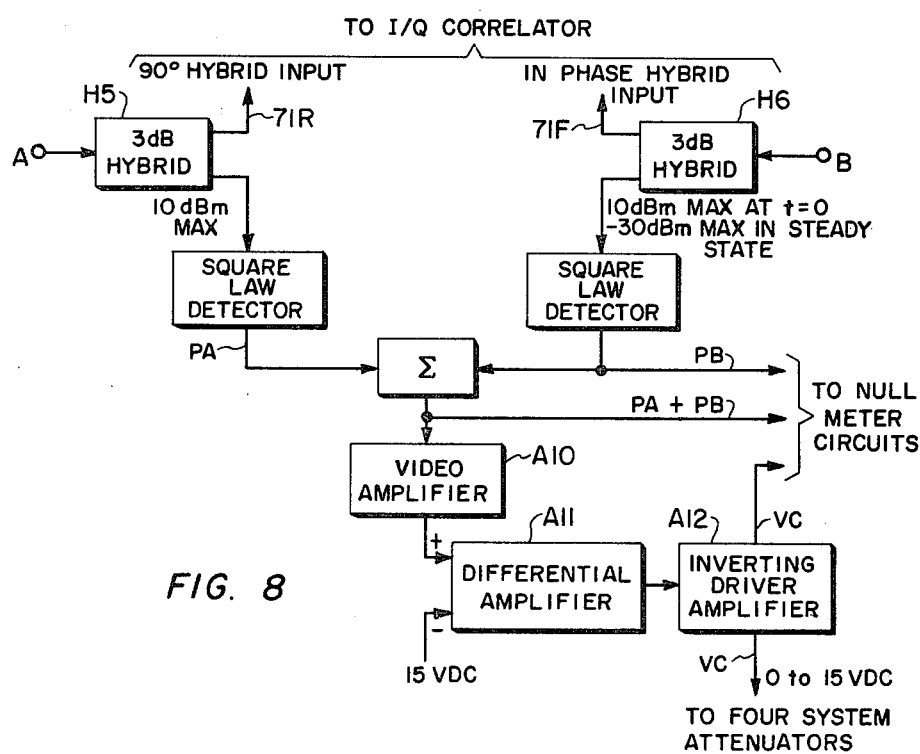
FIG. 8 shows the AGC control circuits for the system of FIGS. 3 and 11.

FIG. 8 contains a block diagram of the AGC control circuits 81 including the interface points with the reference (A) and feedback (B) channels. The power in both signals is first determined through square law detection. The detected output PB from the reference channel is also used as one of the null meter circuit inputs. Both detected signals are then summed and amplified at video. The output of the video amplifier A10 drives the positive port of a differential amplifier A11. The negative port of the differential amplifier is driven by a 15 volt dc reference voltage. The output of the differential amplifier becomes the input to an inverting driver amplifier A12 which generates the 0 to 15 Vdc drive signals on lead VC for each of the four system attenuators.

Attenuators such as the AT-101 yield maximum attenuation at zero control voltage and minimum attenuation at 15 volts. When the power in the reference (A) signal and/or the feedback signal (B) is high the video amplifier gain is such that the positive (+) input to the differential amplifier becomes about 15 volts. Under this condition the output of the differential amplifier approaches zero volts implying maximum attenuation in the four system attenuators.

In Phase/Quadrature Correlator

The in-phase quadrature correlator (FIG. 7C) is composed of a 90 degree hybrid H8, an in-phase hybrid H9, a pair of phase detectors or mixers M8 and M9, a pair of low-pass filters F8 and F9, and a pair of video amplifiers A8 and A9.

Figure 7C:
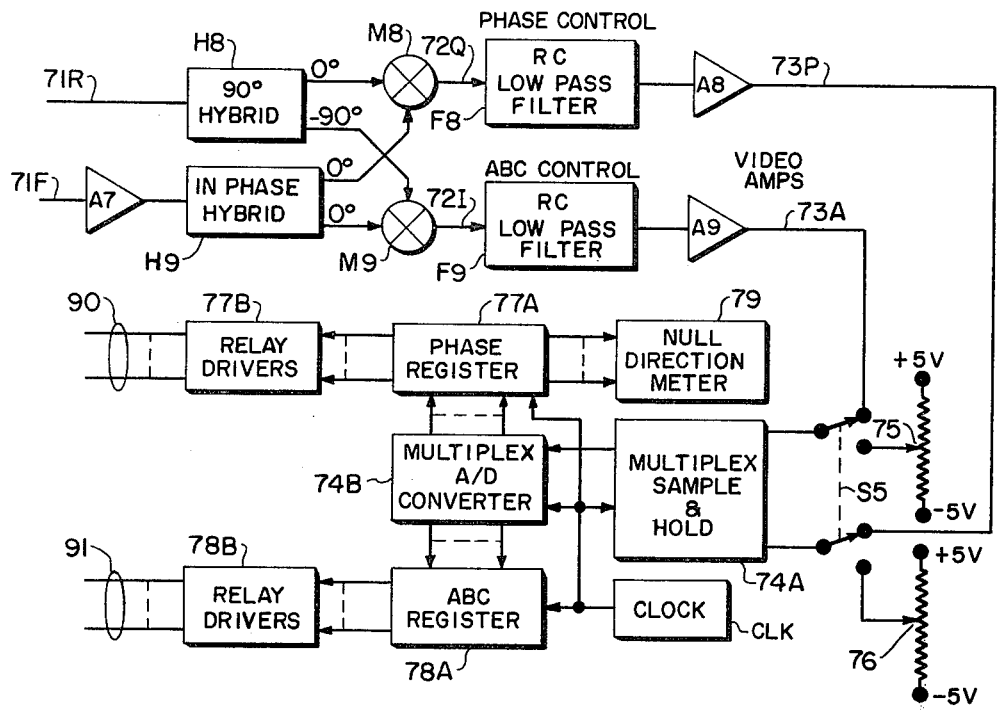

The output from the upper mixer in the correlator of FIG. 7C is the ABC control signal after suitable integration while the lower mixer output is the phase control signal after similar integration. Conventional RC filter techniques are used to achieve integration time constants of 10 seconds. Gains are chosen in the two video amplifiers after the low-pass filters to ensure a ±5V bipolar drive signal capability to the subsequent digital control circuits. The required video gain is on the order of 300 V/V.

Digital Multiplexing Technique

The two analog video output signals from the correlator are multiplexed in a single sample and hold circuit 74A which uses two SPST switches under the control of a master clock. An A/D converter alternately outputs quantized ABC and phase signals into appropriate phase and ABC registers 77A and 78A. Data in the phase register is also used to estimate null direction. The register outputs control two sets of relay drivers 77B and 78B. The outputs of the first set control the 0 to 12.5 nanosecond phase shifter 64 while the outputs of the second set control the 0 to 12.5 nanosecond phase shifter 67 in the ABC network.

Correlator Integration Network

Figure 9:
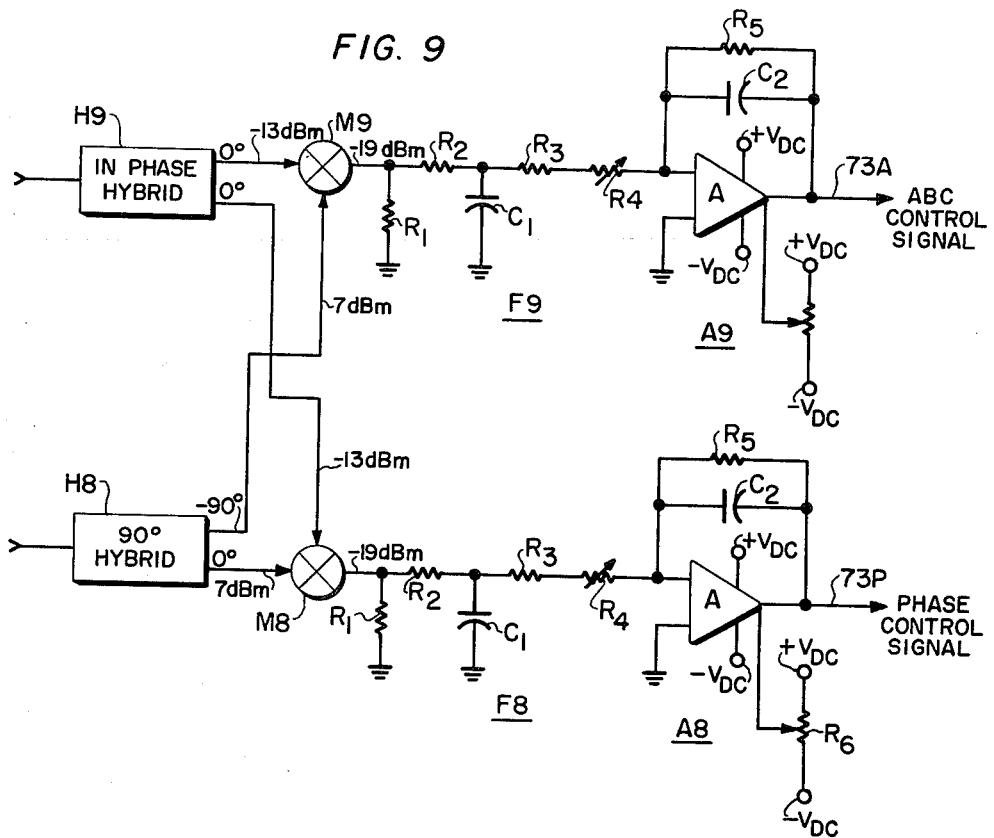
FIG. 9 is a diagram of an in phase/quadrature correlator for the system of FIGS. 3 and 7.

The correlator integration network shown in FIG. 7C is shown in more detail in FIG. 9.

Two single pole RC filters are used in each of the identical video paths of FIG. 9. The filter implemented with the $R_2C_1$ combination is used to minimize any high frequency inputs to operational amplifier A. The cutoff frequency of this filter is about 2500 radians per second. Actual control loop filtering is dominated by the $R_5C_2$ filter in the feedback path of the operational amplifier. Values of $R_5$ and $C_2$ are selected to insure a rise time of about 10 seconds. Variations of potentiometer $R_4$ only affects the dc gain of the operational amplifier.

Use of an operational amplifier such as the Burr Brown 3291/14 can provide about 300 volts/volt gain with an output noise level of ±600 v and a voltage drift of ±30 v/degrees C.

SUMMARY AND ALTERNATE EMBODIMENT

In order to null the interference at low signal to noise ratios and also cope with high level interference from an adjacent transmitter, a large dynamic range is required in the processor. Techniques have been developed in order to achieve the necessary system performance over large input dynamic ranges. The approach developed involves the use of automatic gain control circuitry (AGC) in both inputs to the system correlator.

In utilizing the AGC technique the gain of the reference signal in the antenna-correlator branch is adjusted automatically on the basis of the interference level received from the antenna. The AGC voltage developed in this channel is also used to control the gain in the feedback path. In this way closed loop gain is essentially made constant for a wide range of input levels. If this were not done performance of the null processor would vary widely for different input interference levels.

Figure 10:
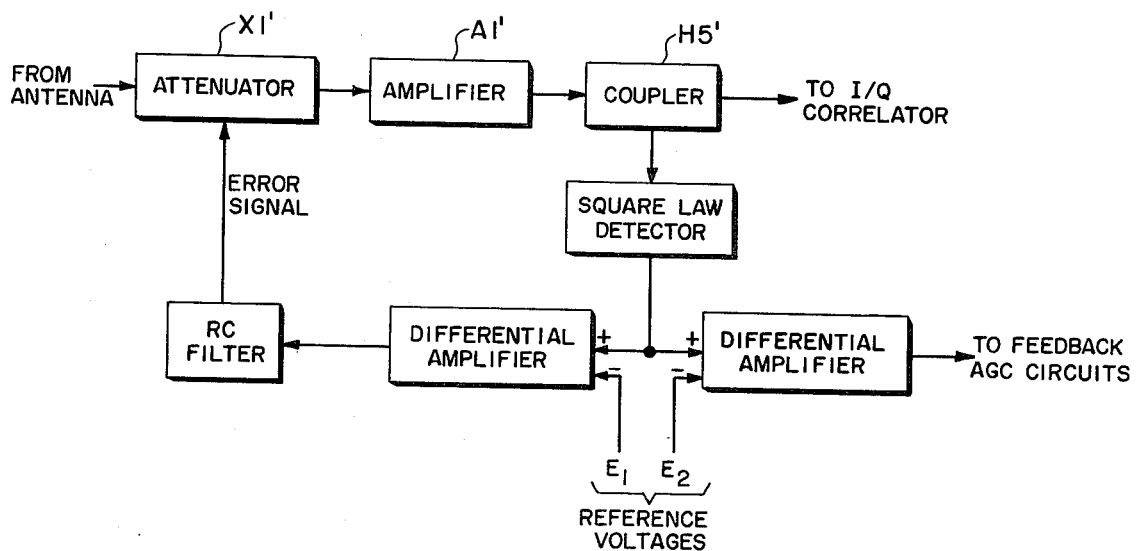
FIG. 10 is a functional block diagram of alternative AGC control circuits.

FIG. 10 contains a simplified block diagram of a basic AGC amplifier, which may be used in the systems of FIGS. 2 or 5. Only the components used in the antenna-correlator branch AGC unit 27 or 27' are shown. The signal from the antenna path is processed in three rf components—an electronically variable attenuator X1', a fixed gain amplifier A1', and a coupler H5'. All three components are available in broadband, miniature configurations.

The output of the coupler H5' is a sampled version of the instantaneous signal which becomes the antenna branch input to the system I/Q correlator. The output of the coupler is square law detected with the detector output driving two differential amplifiers. The control error signal for the AGC amplifier in the antenna-correlator branch is generated by comparison with the E1 reference voltage input in a differential amplifier. The output of this differential amplifier is filtered using standard RC circuit techniques in order to generate the actual error signal controlling the electronic attenuator. The bandwidth of the RC filter is selected in accordance with the desired AGC response time.

A second differential amplifier and reference signal (E2), are used to generate the control error signal for the AGC unit 29 or 29' in the system feedback path (FIG. 2 or 5). Identical rf components (not shown) are used in the second AGC unit so that any frequency dependent amplitude and phase errors introduced in one branch are also introduced in identical fashion for the other branch.

What is claimed is:

1. A steerable null antenna processor system for receiving desired wave energy signals from at least one angular region of space within the area covered by the system and for suppressing interfering signals from at least one other angular region, comprising:
    antenna means having at least first and second antenna elements,
    antenna signal path means including combining means coupled between said antenna elements and an output port for supplying said desired wave energy signals to said output port;
    nulling means forming part of said antenna signal path means, the nulling means having control inputs and apparatus which responsive to correction signals at the control inputs at least partially cancels said interfering signals from appearing at said output port;
    correlator means, a reference path from the antenna signal path means to the correlator means, a feedback path coupled from said output port to the correlator means, said correlator means having apparatus including mixing means to process signals from the reference path and from the feedback path to develop the correction signals and to connections to supply them to said control inputs;
    gain control means comprising first gain adjusting means in the reference path, second gain adjusting means in the feedback path, a control circuit, coupling means in the reference path after the first gain adjusting means to supply an input signal to the control circuit, the control circuit being responsive at least to the last said input signal to develop control signals supplied to the first and second gain adjusting means.

2. A system according to claim 1, wherein said correlator means is adapted to use a least means square algorithm, and wherein in said gain control means said control circuit includes detector means.

3. A system according to claim 2, wherein said nulling means includes phase and amplitude control circuits.

4. A system according to claim 3 wherein said antenna signal path means comprises a main branch between the first antenna element and the combining means, and an auxiliary branch between the second antenna element and the combining means, with said phase and amplitude control circuits in the auxiliary branch;
    wherein said reference path is connected to the second antenna element,
    and wherein in said gain control means said control circuit includes a first differential amplifier and RC filter between said detector means and the first gain adjusting means, and a similar differential amplifier and RC filter between the detector means and the second gain adjusting means.

5. A system according to claim 3, having more than two antenna elements and more than one correlator means, with each correlator means having inputs from a reference path and a feedback path, and with gain control means in both the reference path and the feedback path for each correlator means.

6. A system according to claim 3, further including coupling means in the feedback path after the second gain adjusting means to supply an input signal to the control circuit of the gain control means, wherein said detector means comprises two square law detectors respectively to said coupling means in the reference path and the feedback path, said control circuit further comprising a summing unit with inputs from the two square law detectors and an output with a signal which is the sum of its two input signals, and a differential amplifier coupled between the output of the summing unit and a control lead which is connected to both the first gain adjusting means and the second gain adjusting means.

7. A system according to claim 6, wherein in said antenna signal path means said combining means includes a sumdifference hybrid having two input ports, a sum port, and a difference port, said output port being said difference port, and said sum port being connected as the start of said reference path.

8. A system according to claim 7, wherein said reference path and said feedback path each comprise a first bandpass section operating at a first fixed center frequency and a second bandpass section operating at a second fixed center frequency, there being mixers before each section with local oscillator signal inputs to derive said first and second fixed frequencies, wherein said first gain adjusting means comprises two variable attenuators located respectively in the first and second sections of the reference path, and similarly said second gain adjusting means comprises two variable attenuators located respectfully in the first and second sections of the feedback path, all four variable attenuators having control inputs connected in common to said control lead from the control circuit.

9. A system according to claim 8, wherein said differential amplifier in addition to the input from the output of the summing unit also has an input at a fixed voltage, and the output of the differential amplifier is coupled to the control lead via an inverting amplifier so that the signal on the control lead is a direct-current which varies between zero and said fixed voltage and wherein said four attenuators yield maximum attenuation at zero control voltage and minimum attenuation at said fixed voltage.

10. A system according to claim 3, 4 or 5 wherein said detector means comprises square law detector means.

* * * * *